Jan. 5, 1932.　　　　　F. M. CURRAN　　　　　1,839,535
INLAID PANEL AND PROCESS OF MAKING SAME
Filed Sept. 27, 1929
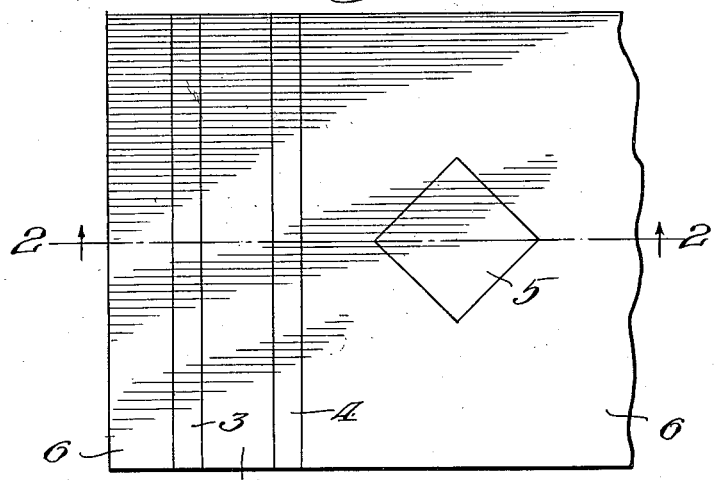
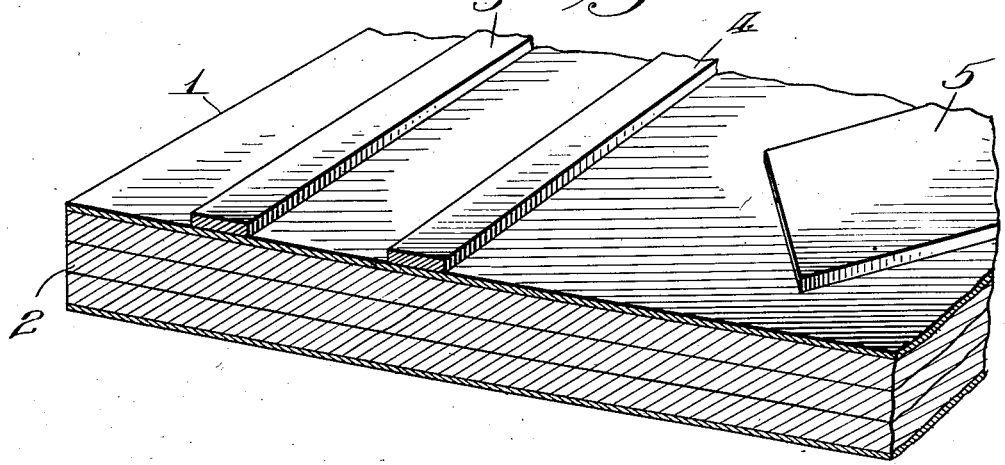
Inventor
Frank M. Curran,
by Wm. F. Freudenreich,
Atty.

Patented Jan. 5, 1932

1,839,535

UNITED STATES PATENT OFFICE

FRANK M. CURRAN, OF GRAND RAPIDS, MICHIGAN, ASSIGNOR TO HASKELITE MANUFACTURING CORPORATION, A CORPORATION OF NEW YORK

INLAID PANEL AND PROCESS OF MAKING SAME

Application filed September 27, 1929. Serial No. 395,736.

Metal sheathed panels, composed of plywood faced with steel sheets glued thereto have acquired a wide field of use, being sometimes faced on the exposed side or sides with wood veneer. The object of the present invention is successfully to produce panels of this kind in which the exposed faces will be in the form of wood inlaid with metal, in order to make possible varied artistic surface effects.

The processes of manufacturing metal-sheathed panels may be said to have become standardized, whereby the cost of such panels has been reduced to a minimum. Viewed in one of its aspects my invention may be said to have for its objects to produce metal-sheathed panels faced with metal-inlaid wood veneer without requiring any change in the process of making the panels that constitute the foundation for my improved product, thereby keeping the cost of making the latter low.

In carrying out my invention the decorative facing is applied directly to the metal sheathing of the panels and therefore it may also be applied to a simple metal sheet or plate, as well. Therefore, viewed in one of its aspects, my invention may be regarded as having for its object easily and at a minimum cost to face a metal sheet or plate with metal-inlaid wood veneer.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:—

Figure 1 is a plan view of a fragment of a panel constructed in accordance with my invention; Fig. 2 is a section on an enlarged scale on line 2—2 of Fig. 1; and Fig. 3 is a perspective view of a fragment of the panel with the metal inlays in place and ready to receive the veneer that is to fill in between or around the inlays.

Referring to the drawings, 1 is the sheet metal sheathing on one face of a panel comprising a core 2 of any suitable material, preferably plywood, having sheet metal glued to both broad faces of the same. Lying upon and permanently secured to the metal sheet 1 are the metal inlays of which three, indicated at 3, 4 and 5, are shown. I preferably solder the inlays to the sheet metal, as I have found that this may be done without the use of so much heat that the adhesive between the sheathing and the core will be injured. The back faces of the inlays and the areas of the sheathing upon which the inlays are to rest may both be tinned, solder being then run into the joints while the inlays are being pressed down firmly. After the inlays have been applied, the excess solder is scraped away and the entire exposed surface of the metal sheathing is cleaned. Glue is then applied to the back of the veneer, indicated at 6, and the veneer is laid on the prepared panel; a number of the panels are piled one on top of the other with suitable pads between; and the stack is then placed in a press to complete the attachment of the veneer.

The wood veneer may be in any suitable form, although I prefer to use multiple ply veneer in order that tight permanent joints between the edges of the veneer and the inlays will be obtained. When simple one-ply veneer sheets are used, these having been cut accurately to fit between and against the inlays, the sheets tend to widen when wet glue is applied and will therefore become larger than the spaces which they are to fill. Also, a single-ply sheet will tend to contract and expand across the grain when the panel is in use, thus opening the joints between the veneer and the inlays. The inlays may extend entirely across the panel, as do the members 3 and 4, or they may be wholly surrounded by the facing veneer, as is the inlay 5, for example.

My improved product may be manufactured in another way. The metal inlays may be soldered to a thin sheet of steel that is to form one of the sheathings for the core. This may be done by tinning the backs of the inlays with a low melting point solder; acid treating the metal sheet; lay the inlays on the sheet; and placing the assembly in a hot press. The wooden inlays, coated on the back with glue, are then laid on the sheet, and the sheet is then assembled with the core and backing elements and placed in a suitable press to complete the gluing at one operation.

It will of course be understood that while I have shown only a few simple forms of inlays, any desired design or variety of designs may be employed. Furthermore, while I have illustrated and described in detail a preferred form of my invention and preferred manner of carrying it out, I do not wish to be limited to the exact details illustrated and described; but intend to cover all forms and methods coming within the definitions of my invention, constituting the appended claims.

I claim:—

1. A panel comprising a core, a metal sheet glued to the core, metal pieces overlying and soldered to the metal sheet, and wood veneer covering and glued to the surface of said metal sheet left exposed by the metal pieces.

2. A panel comprising a metal sheet, metal pieces overlying and soldered to the sheet, the combined areas of metal pieces being less than that of said sheet, and wood veneer covering and glued to the surfaces of the metal sheet left exposed by the metal pieces.

3. A panel comprising a core, a metal sheet glued to the core, a metal piece overlying and fastened to the metal sheet, and wood veneer covering and glued to the surface of the metal sheet left exposed by the said metal piece.

4. The process of facing a metal-sheathed panel with metal-inlaid wood veneer, which consists in fastening one or more pieces of metal to the metal sheathing, and then gluing wood veneer to the exposed surface of the sheathing.

5. The process of facing a metal-sheathed panel with metal-inlaid wood veneer, which consists in soldering one or more pieces of metal to the sheathing, and then gluing to the surface of the sheathing left exposed wood veneer shaped to cover said surface and engage with the edges of the metal piece or pieces.

6. The process of facing a metal sheet with metal-inlaid wood veneer, which consists in fastening to the face of the sheet a piece or pieces of metal, and then gluing wood veneer on the part of the surface of the sheet left exposed by said piece or pieces to cover the same.

In testimony whereof, I sign this specification.

FRANK M. CURRAN.